US010725311B2

(12) United States Patent
Zhang et al.

(10) Patent No.: US 10,725,311 B2
(45) Date of Patent: Jul. 28, 2020

(54) LASER PROJECTOR, IMAGE ACQUISITION DEVICE AND ELECTRONIC APPARATUS

(71) Applicant: GUANGDONG OPPO MOBILE TELECOMMUNICATIONS CORP., LTD., Guangdong (CN)

(72) Inventors: Xueyong Zhang, Guangdong (CN); Xiangnan Lyu, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/384,880

(22) Filed: Apr. 15, 2019

(65) Prior Publication Data

US 2020/0004035 A1  Jan. 2, 2020

(30) Foreign Application Priority Data

Jun. 28, 2018 (CN) .......................... 2018 1 0690798

(51) Int. Cl.
*G02B 27/30* (2006.01)
*G02B 27/42* (2006.01)
(Continued)

(52) U.S. Cl.
CPC ......... *G02B 27/4205* (2013.01); *G02B 27/30* (2013.01); *G03B 21/2033* (2013.01); *H04N 5/2252* (2013.01); *H04N 5/2256* (2013.01)

(58) Field of Classification Search
None
See application file for complete search history.

(56) References Cited

U.S. PATENT DOCUMENTS

2008/0128508 A1* 6/2008 Tsikos ................ G06K 7/10732
235/462.42
2008/0225403 A1  9/2008 Weekamp et al.
(Continued)

FOREIGN PATENT DOCUMENTS

CN  204269939     4/2015
CN  107102506     8/2017
(Continued)

OTHER PUBLICATIONS

WIPO, English Translation of ISR and WO for PCT/CN2019/070681, dated Apr. 8, 2019.
(Continued)

*Primary Examiner* — Eileen M Adams
(74) *Attorney, Agent, or Firm* — Hodgson Russ LLP

(57) ABSTRACT

A laser projector, an image acquisition device, and an electronic apparatus are provided. The laser projector includes a substrate assembly, a lens barrel, and a diffractive optical assembly. The lens barrel includes a lens barrel sidewall provided to the substrate assembly. The lens barrel sidewall includes a first face and a second face opposite to each other. The second face is joined to the substrate assembly. The diffractive optical assembly is provided to the first face. The diffractive optical assembly includes a diffractive optical element and a top cover, and the diffractive optical element and the top cover are fixedly connected. The diffractive optical element is located within the lens barrel, and the top cover is at least partially located outside the lens barrel and clamps the lens barrel together with the diffractive optical element.

20 Claims, 9 Drawing Sheets

(51) Int. Cl.
*G03B 21/20* (2006.01)
*H04N 5/225* (2006.01)

(56) References Cited

U.S. PATENT DOCUMENTS

| | | | |
|---|---|---|---|
| 2009/0057544 A1 | 3/2009 | Brodie et al. | |
| 2010/0014304 A1* | 1/2010 | Frey | G02B 7/022 |
| | | | 362/507 |
| 2018/0059430 A1 | 3/2018 | Mor | |

FOREIGN PATENT DOCUMENTS

| | | |
|---|---|---|
| CN | 107991836 | 5/2018 |
| CN | 108181777 | 6/2018 |
| CN | 108196416 | 6/2018 |
| CN | 108344375 | 7/2018 |
| CN | 108776391 | 11/2018 |
| CN | 108924295 | 11/2018 |
| EP | 1072922 | 1/2001 |
| JP | 2014190823 | 10/2014 |

OTHER PUBLICATIONS

SIPO, First Office Action for CN Application No. 201810690798.5, dated Jun. 27, 2019.
EPO, Office Action for EP Application No. 19178343.0, dated Dec. 9, 2019.

* cited by examiner

US 10,725,311 B2

LASER PROJECTOR, IMAGE ACQUISITION DEVICE AND ELECTRONIC APPARATUS

CROSS-REFERENCE TO RELATED APPLICATION

This application claims priority to Chinese Patent Application No. 201810690798.5 filed on Jun. 28, 2018, the entire disclosure of which is incorporated herein by reference.

FIELD

The present application relates to a field of optical and electronic technologies, more particularly to a laser projector, an image acquisition device and an electronic apparatus.

BACKGROUND

A diffractive optical element (DOE) of a laser projector is required to be provided in an emission path of laser, and the diffractive optical element is usually directly adhered to a lens barrel of the laser projector by glue.

SUMMARY

A laser projector according to embodiments of the present application includes a substrate assembly, a lens barrel, and a diffractive optical assembly. The lens barrel includes a lens barrel sidewall provided to the substrate assembly. The lens barrel sidewall includes a first face and a second face opposite to each other. The second face is joined to the substrate assembly. The diffractive optical assembly is provided to the first face. The diffractive optical assembly includes a diffractive optical element and a top cover, and the diffractive optical element and the top cover are fixedly connected. The diffractive optical element is located within the lens barrel, and the top cover is at least partially located outside the lens barrel and clamps the lens barrel together with the diffractive optical element.

An image acquisition device according to embodiments of the present application includes the laser projector according to the above embodiments and an image acquirer. The image acquirer is configured to acquire a laser pattern projected into a target space through the diffractive optical element, and the laser pattern is configured to form a depth image.

An electronic apparatus according to embodiments of the present application includes a housing and the image acquisition device according to the above embodiments, and the image acquisition device is provided to the housing and configured to acquire a depth image.

Additional aspects and advantages of the present application will be given in the following description, some of which will become apparent from the following description or be learned from practices of the present application.

BRIEF DESCRIPTION OF THE DRAWINGS

The above and/or additional aspects and advantages of the present application will become apparent and easy to understand from descriptions of the embodiments with reference to the drawings, in which.

DETAILED DESCRIPTION

Figure 1:
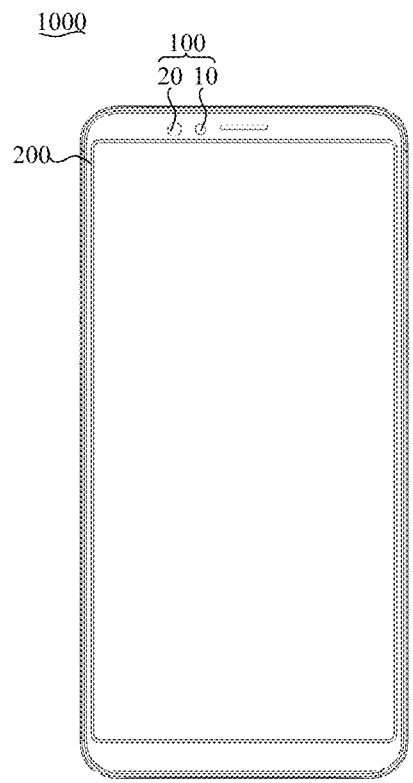
FIG. 1 is a schematic view of an electronic apparatus according to an embodiment of the present application.

Embodiments of the present application are further described with reference to the accompanying drawings. Reference signs that are the same or similar from beginning to end represent the same or similar components or components that have the same or similar functions. In addition, the embodiments described below with reference to the accompanying drawings are exemplary, are merely used to explain the present application, and cannot be construed as a limit to the present application.

As illustrated in FIGS. 3-6, a laser projector 10 according to embodiments of the present application includes a substrate assembly 11, a lens barrel 12 and a diffractive optical assembly 15. The lens barrel 12 includes a lens barrel sidewall 122 provided to the substrate assembly 11. The lens barrel sidewall 122 includes a first face 124 and a second face 125 opposite to each other, and the second face 125 is joined to the substrate assembly 11. The diffractive optical assembly 15 is provided to the first face 124. The diffractive optical assembly 15 includes a diffractive optical element 151 and a top cover 152, and the diffractive optical element 151 and the top cover 152 are fixedly connected. The diffractive optical element 151 is located within the lens barrel 12, and the top cover 152 is at least partially located outside the lens barrel 12 and clamps the lens barrel 12 together with the diffractive optical element 151.

Figure 6:
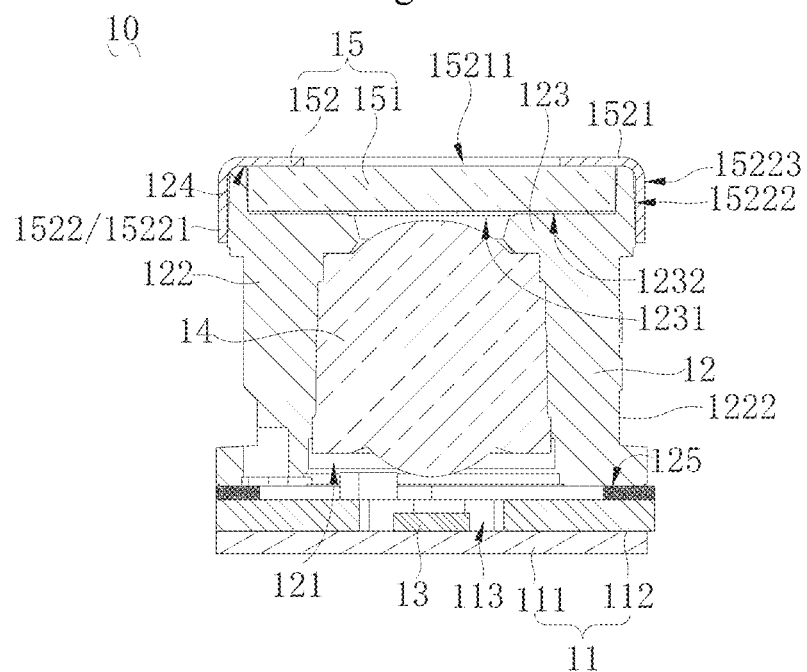
FIG. 6 is a sectional view of the laser projector taken along a line VI-VI shown in FIG. 4.

As illustrated in FIG. 6, in some embodiments, the lens barrel 12 defines an accommodating cavity 121 together with the substrate assembly 11. The diffractive optical element 151 is accommodated in the accommodating cavity 121.

As illustrated in FIG. 6, in some embodiments, the top cover 152 includes a protection top wall 1521 and a protection sidewall 1522 extending from a periphery of the protection top wall 1521. The protection top wall 1521 is joined to the diffractive optical element 151, and the diffractive optical element 151 abuts an inner wall face 1224 of the lens barrel sidewall 122, the protection sidewall 1522 abuts an outer wall face 1223 of the lens barrel sidewall 122.

Figure 20:
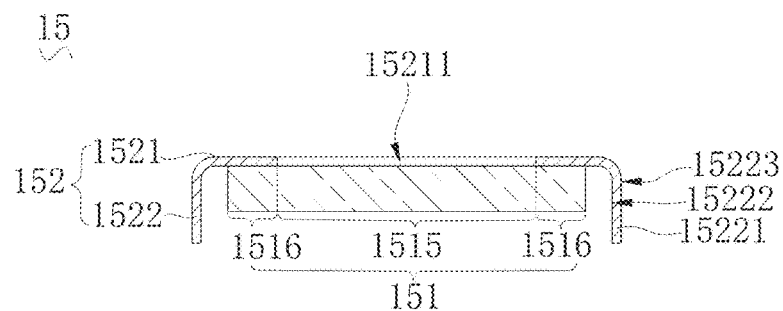
FIG. 20 is a schematic view of a diffractive optical assembly according to yet another embodiment of the present application.

As illustrated in FIG. 20, in some embodiments, the diffractive optical element 151 includes a working portion 1515 and a joining portion 1516 provided around the working portion 1515. The protection top wall 1521 defines a light passage hole 15211. The light passage hole 15211 corresponds to the working portion 1515, and the joining portion 1516 is fixedly connected to the protection top wall 1521.

As illustrated in FIG. 6, in some embodiments, the protection top wall 1521 is made of a transparent material. The diffractive optical element 151 includes an incident face 1512 and an emission face 1511. The protection top wall 1521 and the emission face 1511 are fixedly connected.

Figure 7:
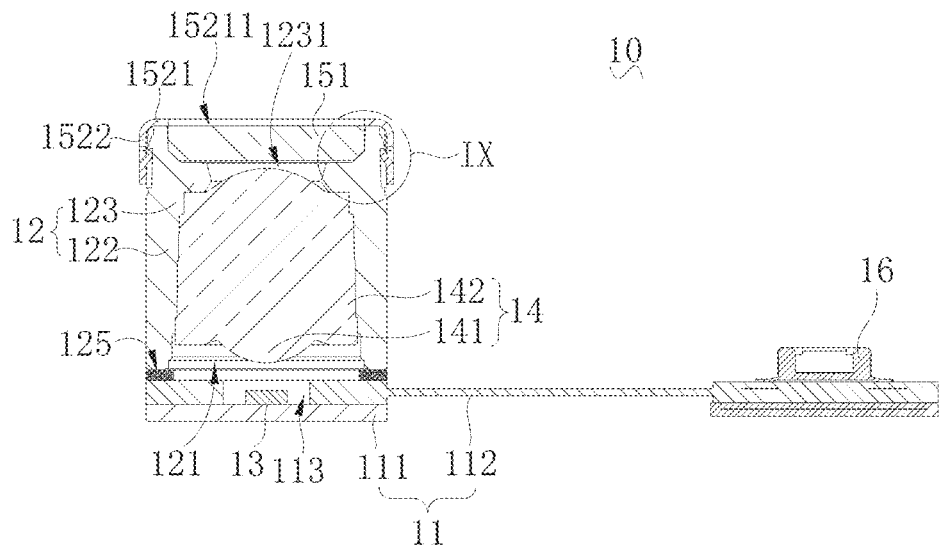
FIG. 7 is a sectional view of a laser projector according to another embodiment of the present application taken along a position corresponding to the line VI-VI shown in FIG. 4.

As illustrated in FIG. 7, in some embodiments, the lens barrel 12 includes a limiting protrusion 123 protruding inwards from the lens barrel sidewall 122. The diffractive optical element 151 abuts the limiting protrusion 123.

Figure 22:
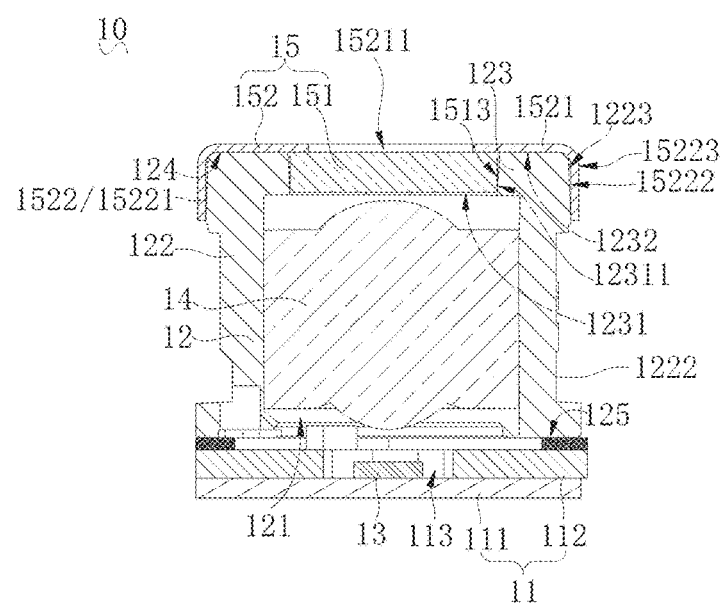
FIG. 22 is a sectional view of a laser projector according to still another embodiment of the present application taken along a position corresponding to the line VI-VI shown in FIG. 4.

As illustrated in FIG. 22, in some embodiments, the lens barrel 12 includes a limiting protrusion 123 protruding inwards from the lens barrel sidewall 123. An upper face 1232 of the limiting protrusion 123 is flush with the first face 124. The limiting protrusion 123 encloses a light via hole 1231. The top cover 152 includes the protection top wall 1521 and the protection sidewall 1522 extending from the periphery of the protection top wall 1521. The diffractive optical element 151 extends into the light via hole 1231 and abuts against an inner wall 12311 of the light via hole 1231. The protection top wall 1521 abuts the limiting protrusion 123, and the protection sidewall 1522 abuts the lens barrel sidewall 122.

As illustrated in FIG. 6, in some embodiments, the diffractive optical element 151 is integrally formed with the top cover 152; or the diffractive optical element 151 is separately formed from the top cover 152.

As illustrated in FIG. 6, in some embodiments, the diffractive optical element 151 has a material which is identical to a material of the top cover 152; or the diffractive optical element 151 has a material which is different from a material of the top cover 152.

Figure 9:
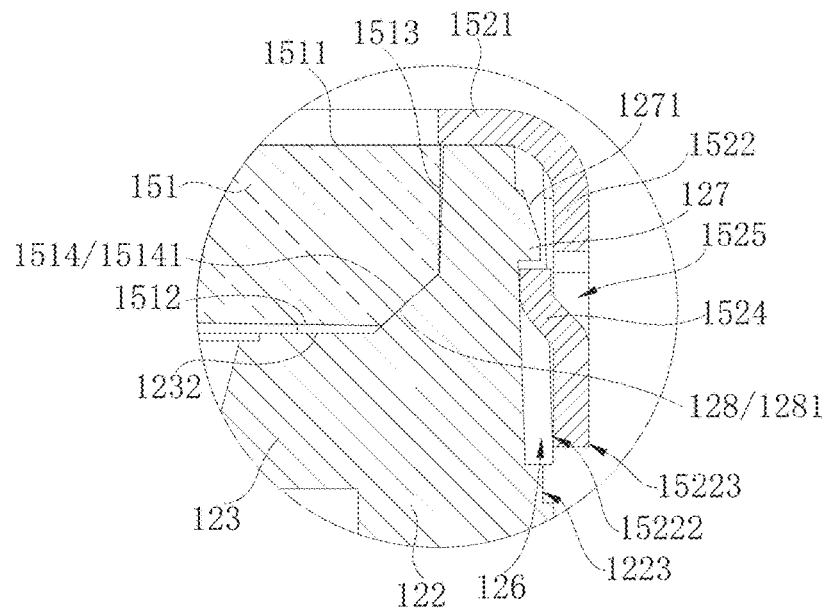
FIG. 9 is an enlarged view of a portion IX of the laser projector shown in FIG. 8.
Figure 10:
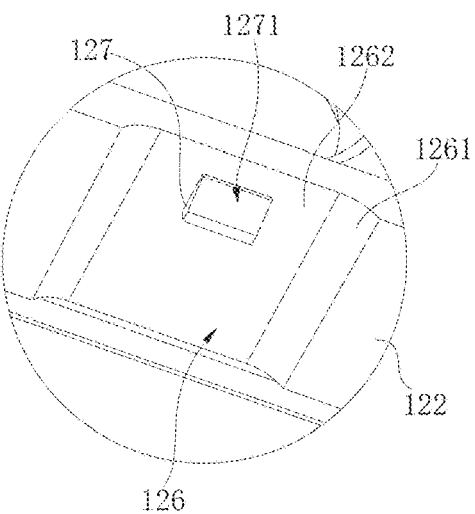
FIG. 10 is an enlarged view of a portion X of the laser projector shown in FIG. 5.
Figure 11:
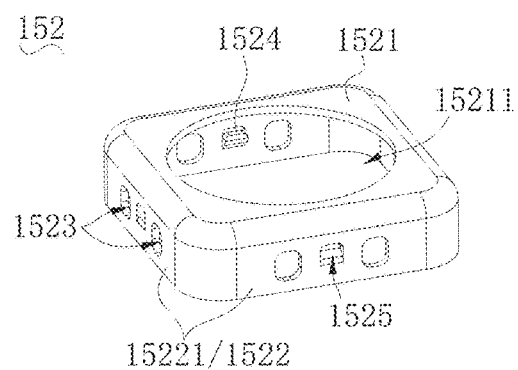
FIG. 11 is a perspective view of a top cover of a laser projector according to an embodiment of the present application.

As illustrated in FIGS. 9-11, in some embodiments, the top cover 152 includes a protection top wall 1521 and a protection sidewall 1522 extending from a periphery of the protection top wall 1521, the top cover 152 further includes an elastic first hook 1524 protruding inwards from the protection sidewall 1522. The lens barrel further includes a second hook 127 protruding outwards from the lens barrel sidewall 122. The first hook 1524 is caught with the second hook 127 when the top cover 152 is fitted over the lens barrel 12.

As illustrated in FIGS. 9 and 11, in some embodiments, the protection sidewall 1522 defines a clearance hole 1525 at a position corresponding to the first hook 1524. The clearance hole 1525 is configured to provide deformation space when the first hook 1524 abuts the second hook 127 and the first hook 1524 is elastically deformed in a process of the top cover 152 being fitted over the lens barrel 12.

As illustrated in FIGS. 9 and 10, in some embodiments, an outer wall of the lens barrel 12 defines a glue receiving groove 126, and the glue receiving groove 126 is opened from the first face 124 and extends towards the second face 125.

As illustrated in FIGS. 9 and 10, in some embodiments, the second hook 127 is provided with a guiding slope 1271. The guiding slope 1271 is gradually away from an inner bottom wall 1262 of the glue receiving groove 126 along a direction in which the top cover 152 is fitted over the lens barrel 12. The first hook 1524 abuts the guiding slope 1271 in the process of the top cover 152 covering the lens barrel 12.

As illustrated in FIG. 11, in some embodiments, the protection sidewall 1522 includes a plurality of protection sub-sidewalls 15221 sequentially connected end to end, and each protection sub-sidewall 15221 is fixedly connected to the lens barrel sidewall 122.

As illustrated in FIG. 11, in some embodiments, each protection sub-sidewall 15221 defines a dispensing hole 1523, and a position of the dispensing hole 1523 corresponds to a position of the glue receiving groove 126.

As illustrated in FIGS. 9 and 10, in some embodiments, an inner sidewall 1261 of the glue receiving groove 126 is obliquely connected to an inner bottom wall 1262 of the glue receiving groove 126 and the outer wall of the lens barrel sidewall 122.

Figure 5:
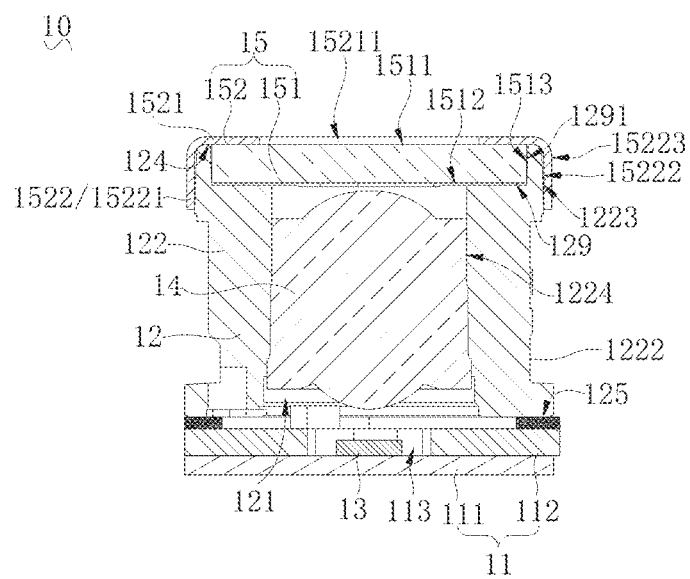
FIG. 5 is a perspective exploded view of a laser projector according to an embodiment of the present application.

As illustrated in FIGS. 5 and 6, in some embodiments, the laser projector 10 further includes a light source 13 and a collimation element 14. The light source 13 is provided to the substrate assembly 11 and is configured to emit laser light to the accommodating cavity 121. The collimation element 14 is accommodated in the accommodating cavity 121. The light source 13, the collimation element 14 and the diffractive optical element 151 are sequentially provided in an optical path of the light source 13.

Figure 2:
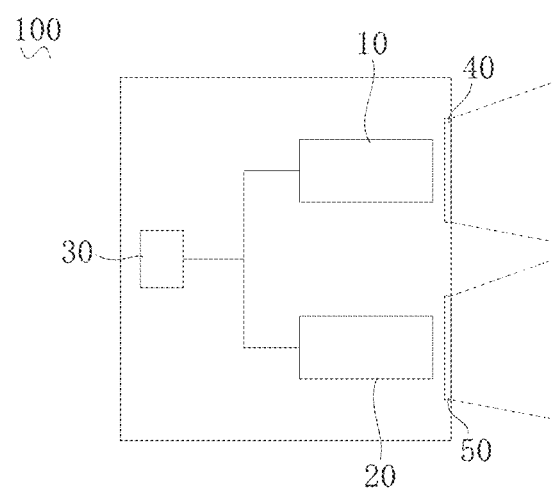
FIG. 2 is a schematic view of an image acquisition device according to an embodiment of the present application.

As illustrated in FIG. 2, an image acquisition device 100 according to embodiments of the present application includes the laser projector 10 and an image acquirer 20. The image acquirer 20 is configured to acquire a laser pattern projected into a target space through the diffractive optical element 151, and the laser pattern is configured to form a depth image.

As illustrated in FIG. 1, an electronic apparatus 1000 according to embodiments of the present application includes a housing 200 and the image acquisition device 100. The image acquisition device 100 is provided to the housing 200 and is configured to acquire the depth image.

As illustrated in FIG. 1, the electronic apparatus 1000 according to embodiments of the present application includes the housing 200 and the image acquisition device 100. The electronic apparatus 1000 can be a mobile phone, a tablet computer, a laptop computer, a game machine, a head-mounted display device, an access control system, a teller machine, etc. The embodiment of the present application is described by taking the electronic apparatus 1000 as a mobile phone as an example. It can be understood that the specific form of the electronic apparatus 1000 may be others and is not limited herein. The image acquisition device 100 is provided in the housing 200 and is exposed from the housing 200 to obtain the depth image, and the housing 200 can provide protection for the image acquisition device 100 against dust, water, drop, etc. The housing 200 defines a hole which is corresponding to the image acquisition device 100, so as to allow light to pass from or into the housing 200 through the hole. In other embodiments, the image acquisition device 100 is accommodated in the housing 200 and may protrude from the housing 200. At this time, it is not necessary to define the hole corresponding to a light entering direction of the image acquisition device 100 in the housing 200. When the image acquisition device 100 is required to be used, the image acquisition device 100 protrudes from the inside of the housing 200 to the outside of the housing 200; when the image acquisition device 100 is not required to be used, the image acquisition device 100 is accommodated from the outside of the housing 200 to the inside of the housing 200. In another embodiment, the image acquisition device 100 is accommodated in the housing 200 and located below the display screen. In this regard, it is not necessary to define the hole corresponding to the light entering direction of the image acquisition device 100 in the housing 200.

As illustrated in FIG. 2, the image acquisition device 100 includes the laser projector 10, the image acquirer 20 and a processor 30. A projection window 40 corresponding to the laser projector 10 and an acquisition window 50 corresponding to the image acquirer 20 may be defined in the image acquisition device 100. The laser projector 10 is configured to project a laser pattern to the target space through the projection window 40, and the image acquirer 20 is configured to acquire the laser pattern modulated by a target object through the acquisition window 50. In one example, the laser light projected by the laser projector 10 is infrared light and the image acquirer 20 is an infrared camera. The processor 30 is connected to both of the laser projector 10 and the image acquirer 20, and the processor 30 is configured to process the laser pattern to obtain the depth image. Specifically, the processor 30 calculates an offset value of each pixel point in the laser pattern and a corresponding pixel point in a reference pattern by an image matching algorithm, and further obtains the depth image of the laser pattern according to the offset value. The image matching algorithm may be a digital image correlation (DIC) algorithm. Of course, other image matching algorithms may be used instead of the DIC algorithm. The structure of the laser projector 10 will be further described below.

Figure 3:
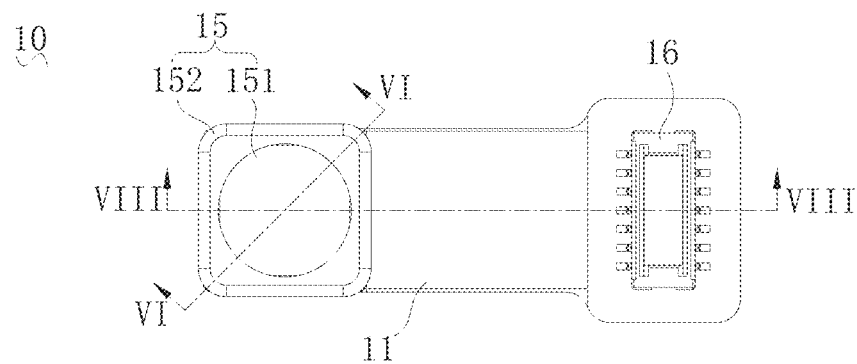
FIG. 3 is a perspective view of a laser projector according to an embodiment of the present application.
Figure 4:
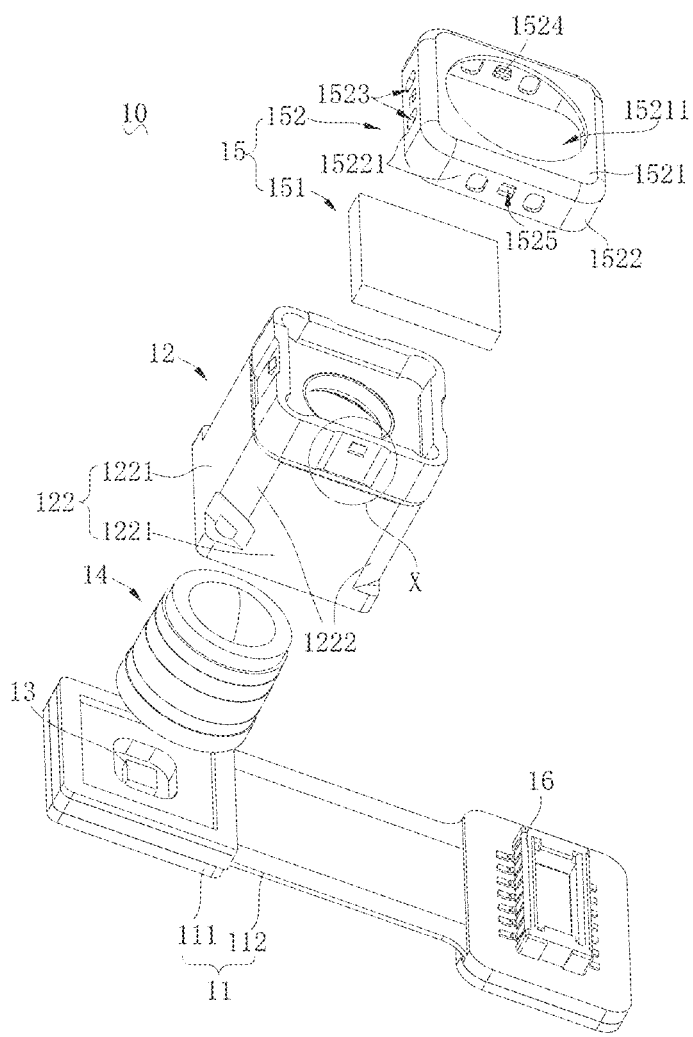
FIG. 4 is a plan view of a laser projector according to an embodiment of the present application.

As illustrated in FIGS. 3-5, the laser projector 10 includes the substrate assembly 11, the lens barrel 12, the light source 13, the collimating element 14 and the diffractive optical assembly 15. The diffractive optical assembly 15 includes the diffractive optical element 151 and the top cover 152, and the diffractive optical element 151 and the top cover 152 are fixedly connected. The light source 13, the collimation element 14 and the diffractive optical element 151 are sequentially provided in the optical path of the light source 13, and specifically, the light emitted from the light source 13 sequentially passes through the collimation element 14 and the diffractive optical element 151. In the related art, the diffractive optical element is usually directly adhered to the lens barrel of the laser projector by glue. The glue is easy to fail, and this causes the diffractive optical element to fall off, such that the laser light emitted directly without passing through the diffractive optical element is likely to burn the user.

As illustrated in FIGS. 5 and 6, the substrate assembly 11 includes a substrate 111 and a circuit board 112 carried on the substrate 111. The substrate 111 is configured to carry the lens barrel 12, the light source 13 and the circuit board 112. The material of the substrate 111 may be plastic, such as at least one of polyethylene glycol terephthalate (PET), polymethyl methacrylate (PMMA), polycarbonate (PC) and polyimide (PI). That is, the substrate 111 may be made of a single plastic material of any of PET, PMMA, PC or PI. As a result, the substrate 111 is lighter in weight and has sufficient support strength.

The circuit board 112 may be any one of a printed circuit board, a flexible circuit board and a rigid-flex board. A via hole 113 may be defined in the circuit board 112, and the via hole 113 may be configured to accommodate the light source 13. A portion of the circuit board 112 is covered by the lens barrel 12, and another portion thereof is extended out and connected to a connector 16. The connector 16 may connect the laser projector 10 to a main board of the electronic apparatus 1000.

Figure 8:
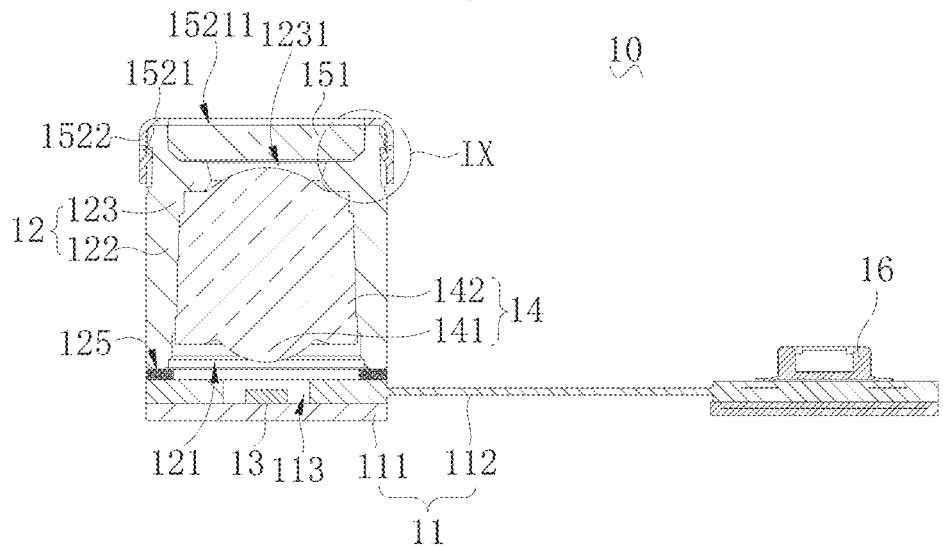
FIG. 8 is a sectional view of the laser projector taken along a line VIII-VIII in FIG. 4.

As illustrated in FIGS. 5 and 8, the lens barrel 12 is provided to the substrate assembly 11 and defines the accommodating cavity 121 together with the substrate assembly 11. Specifically, the lens barrel 12 may be connected to the circuit board 112 of the substrate assembly 11. The lens barrel 12 and the circuit board 112 may be connected by welding, gluing, screwing, or snapping to improve the airtightness of the accommodating cavity 121. Of course, the specific connection manner of the lens barrel 12 and the substrate assembly 11 may be others, for example, snap connection. The accommodating cavity 121 may be configured to accommodate components such as the collimation element 14 and the diffractive optical element 151, and the accommodating cavity 121 simultaneously forms a part of the optical path of the laser projector 10. The lens barrel 12 is made of a non-conductive material, for example, the lens barrel 12 is made of plastic which includes any one of PET, PMMA, PC, or PI; or the lens barrel 12 is made of a conductive material, but an outer face of the lens barrel 12 is provided with an insulating layer to make the lens barrel 12 non-conductive.

Specifically, the lens barrel 12 includes the lens barrel sidewall 122. The lens barrel sidewall 122 is provided to the substrate assembly 11 and defines the accommodating cavity 121 together with the substrate assembly 11. The lens barrel sidewall 122 includes a plurality of lens barrel sub-sidewalls 1221, each of which is joined to the substrate assembly 11. The plurality of lens barrel sub-sidewalls 1221 are sequentially connected to assume an annular shape and collectively surround the accommodating cavity 121. The ends of any two connected lens barrel sub-sidewalls 1221 together form a support chamfer 1222, and the lens barrel 12 of the present embodiment is provided with four support chamfers 1222. The outer wall of the lens barrel sidewall 122 may be provided with a positioning and mounting structure to secure the position of the laser projector 10 when the laser projector 10 is mounted within the electronic apparatus 1000 of the embodiment in FIG. 1.

As illustrated in FIG. 6, the lens barrel 12 further includes a first face 124 and a second face 125 opposite to each other. One opening of the accommodating cavity 121 is defined in the second face 125, and the other opening is defined in the first face 124. The second face 125 is joined to the circuit board 112, such as by gluing, and the first face 124 may serve as a joining face of the lens barrel 12 and the diffractive optical element 151 or as a joining face of the lens barrel 12 and the top cover 152. As illustrated in FIGS. 9 and 10, the outer wall of the lens barrel sidewall 122 defines a glue receiving groove 126, and the glue receiving groove 126 may be opened from the first face 124 and extend toward the second face 125.

As illustrated in FIG. 8, the light source 13 is provided to the substrate assembly 11. Specifically, the light source 13 may be provided to the circuit board 112 and electrically connected to the circuit board 112. The light source 13 may also be provided to the substrate 111 and correspond to the via hole 113. In this case, the light source 13 may be electrically connected to the circuit board 112 by arranging wires. In one example, the substrate 111 may be omitted and the light source 13 is directly electrically connected to the circuit board 112. The light source 13 is configured to emit laser light, and the laser light may be infrared light. In one example, the light source 13 may include a semiconductor underlay and an emitting laser provided to the semiconductor underlay, the semiconductor underlay is provided to the substrate 111, and the emitting laser may be a vertical cavity surface emitting laser (VCSEL). The semiconductor underlay may be provided with a single emitting laser, or an array laser composed of a plurality of emitting lasers. Specifically, the plurality of emitting lasers may be arranged on the semiconductor underlay in a regular or irregular two-dimensional pattern form.

As illustrated in FIG. 8, the collimation element 14 may be an optical lens, and the collimation element 14 is configured to collimate the laser light emitted from the light source 13. The collimation element 14 is accommodated in the accommodating cavity 121, and the collimation element 14 may be assembled into the accommodating cavity 121 along a direction in which the second face 125 is directed to the first face 124. The collimation element 14 includes an optical portion 141 and a mounting portion 142, and the mounting portion 142 is configured to join the lens barrel sidewall 122 and fix the collimation element 14. In the embodiment of the present application, the optical portion 141 includes two curved faces on opposite sides of the collimation element 14.

As illustrated in FIGS. 5 and 6, the diffractive optical assembly 15 is disposed to the first face 124. The diffractive optical assembly 15 includes the diffractive optical element 151 and the top cover 152, and the diffractive optical element 151 and the top cover 152 are fixedly connected. The diffractive optical element 151 is located in the lens barrel 12, and the top cover 152 is at least partially located outside the lens barrel 12 and clamps the lens barrel 12 together with the diffractive optical element 151.

Specifically, the diffractive optical element 151 is accommodated in the accommodating cavity 121. The outer face of the diffractive optical element 151 includes an emission face 1511, an incident face 1512, and a side face 1513. The emission face 1511 is opposite to the incident face 1512, and the side face 1513 is connected to the emission face 1511 and the incident face 1512. In the embodiment of the present application, the incident face 1512 is provided with a diffractive structure, and the emission face 1511 may be a smooth plane. The diffractive optical element 151 may project the laser light collimated by the collimation element 14 into a laser pattern corresponding to the diffractive structure.

As illustrated in FIGS. 6 and 8, the top cover 152 is fixedly connected to the lens barrel 12, and the top cover 152 is configured to limit the position of the diffractive optical element 151. Specifically, the top cover 152 is configured to prevent the diffractive optical element 151 from escaping from the lens barrel 12 after failure of the joining with the lens barrel 12. As illustrated in FIG. 11, the top cover 152 includes the protection top wall 1521 and the protection sidewall 1522.

The protection top wall 1521 is joined to the diffractive optical element 151, and the protection top wall 1521 is also joined to the first face 124 to limit the position of the diffractive optical element 151. That is, even if the joining of the diffractive optical element 151 and the lens barrel 12 fails, the diffractive optical element 151 will not escape due to the restrictive action of the protection top wall 1521 and the first face 124. In the embodiment shown in FIG. 6, when the top cover 152 is joined to the lens barrel 12, the protection top wall 1521 is fixedly connected to the emission face 1511, and the protection top wall 1521 abuts the first face 124. Further, the protection top wall 1521 and the emission face 1511 are connected by gluing, snapping, etc., and the protection top wall 1521 is joined to the first face 124 by gluing.

As illustrated in FIGS. 9-11, the protection sidewall 1522 extends from the periphery of the protection top wall 1521, the top cover 152 is covered on the lens barrel 12, and the protection sidewall 1522 is fixedly connected to the lens barrel sidewall 122. Specifically, the protection sidewall 1522 abuts the outer wall face 1223 of the lens barrel sidewall 122. Specifically, the protection sidewall 1522 includes a plurality of protection sub-sidewalls 15221 that are sequentially connected end to end, and each protection sub-sidewall 15221 is fixedly connected to the lens barrel sidewall 122. Thus, the diffractive optical element 151 and the plurality of protection sub-sidewalls 15221 collectively clamp the lens barrel 12, and the diffractive optical assembly 15 is securely covered on the lens barrel 12.

In summary, in the laser projector 10, the image acquisition device 100, and the electronic apparatus 1000 according to the embodiments of the present application, the diffractive optical element 151 and the top cover 152 collectively clamp the lens barrel 12 by providing the diffractive optical element 151 and the top cover 152 which are fixedly connected. The diffractive optical assembly 15 will not overturn with respect to the lens barrel 12, and the diffractive optical element 151 does not easily fall off, which prevents the laser light emitted out directly without passing through the diffractive optical element 151 from burning the user, thereby improving the safety level of the user using the laser projector 10.

As illustrated in FIG. 6, in some embodiments, the top cover 152 is made of an opaque material, such as plastic. The protection top wall 1521 defines a light passage hole 15211. The position of the light passage hole 15211 corresponds to the diffractive optical element 151. The laser light passes through the collimation element 14, the diffractive optical element 151 and the light passage hole 15211, and then is emitted from the laser projector 10. In the embodiment of the present application, the overall shape of the protection top wall 1521 is rounded square, and the light passage hole 15211 may be circular, rectangular, elliptical, trapezoidal or the like. In another example, the protection top wall 1521 is made of a light transparent material such as glass, polymethyl methacrylate (PMMA), polycarbonate (PC), polyimide (PI) and so on. Since the light transparent materials such as glass, PMMA, PC, and PI all have excellent light transparent properties, there is no need to define the light passage hole 15211 in the protection top wall 1521. Thus, under the covering of the protection top wall 1521, the diffractive optical element 151 will not be exposed to the outside of the lens barrel 12, thereby making the diffractive optical element 151 more waterproof and dustproof.

In some embodiments, the diffractive optical element 151 has a material identical to the material of the top cover 152, for example, both made of glass, or both made of plastic (such as PET). In another example, the diffractive optical element 151 has a material different from the material of the top cover 152. For example, the diffractive optical element 151 is made of glass, and the top cover 152 is made of plastic; or the diffractive optical element 151 is made of plastic, and the top cover 152 is made of glass.

In some embodiments, the diffractive optical element 151 is integrally formed with the top cover 152; alternatively, the diffractive optical element 151 is formed separately from the top cover 152. When the diffractive optical element 151 and the top cover 152 have the same materials, for example, when both are plastic, the diffractive optical element 151 and the top cover 152 are integrally formed directly by injection molding; for another example, when both are glass, the diffractive optical element 151 and the top cover 152 are integrally formed directly by integral cutting. Thus, the diffractive optical element 151 is more reliably joined to the top cover 152 by being integrally formed. When the diffractive optical element 151 has the material different from the material of the top cover 152, for example, the diffractive optical element 151 is made of glass, and the top cover 152 is made of plastic. The separated optical element 151 and top cover 152 are joined in a manner including gluing, snapping, etc. to form the diffractive optical assembly 15. Specifically, in the embodiment shown in FIG. 7, the lens barrel 12 includes a limiting protrusion 123 extending inwards from the lens barrel sidewall 122. When the laser projector 10 is assembled, the diffractive optical element 151 may be mounted to the limiting protrusion 123, and then the top cover 152 is fixedly connected to the diffractive optical element 151, the top cover 152 is fixedly connected to the lens barrel sidewall 122. Thus, by being separately formed, the diffractive optical element 151 may be separately mounted before the top cover 152 is mounted. In addition, when the diffractive optical element 151 is not mounted stably, it is also convenient to adjust the mounting position of the diffractive optical element 151, and then mount the top cover 152. Of course, when the diffractive optical element 151 is separately formed from the top cover 152, a separate fixing structure such as a snap groove may be provided to the diffractive optical element 151 to better limit the position of the diffractive optical element 151 within the lens barrel 12.

As illustrated in FIG. 6, in some embodiments, the lens barrel 12 and the substrate assembly 11 together define the accommodating cavity 121. The top cover 152 includes the protection top wall 1522 and the protection sidewall 1522 extending from the periphery of the protection top wall 1521. The element 151 is accommodated in the accommodating cavity 121, and the protection top wall 1521 is joined to the diffractive optical element 151. The diffractive optical element 151 abuts the inner wall face 1224 of the lens barrel sidewall 122, and the protection sidewall 1522 abuts the outer wall face 1223 of the lens barrel sidewall 122.

Specifically, the lens barrel sidewall 122 includes the outer wall face 1223 and the inner wall face 1224 opposite to each other. When the diffractive optical element 15 is assembled to the lens barrel 12, the diffractive optical element 151 extends into an opening of the lens barrel 12 and is accommodated in the accommodating cavity 121. The lens barrel 12 is entirely cylindrical. The diffractive optical element 151 directly abuts the inner wall face 1224 after passing through the opening of the lens barrel 12. The protection top wall 1521 and the protection sidewall 1522 are both located outside the lens barrel 12, and the protection top wall 1521 abuts the first face 124 of the lens barrel 12, and the protection sidewall 1522 abuts the outer wall face 1223. In the embodiment of FIG. 6, the first face 124 of the lens barrel 12 is further defines a receiving groove 129, and the groove sidewall face 1291 of the receiving groove 129 and the inner wall face 1224 are stepped. The diffractive optical element 151 is accommodated in the receiving groove 129 and abuts the groove sidewall face 1291. Thus, the diffractive optical element 151, the protection top wall 1521 and the protection sidewall 1522 collectively clamp the lens barrel 12, and the diffractive optical assembly 15 is firmly joined with the lens barrel 12. The diffractive optical assembly 15 is less likely to fall off in a light-emitting direction of the light source 13, and is less likely to rotate around the lens barrel sidewall 122 to fall off, either.

As illustrated in FIG. 7, in some embodiments, the lens barrel 12 further includes the limiting protrusion 123 protruding inwards from the lens barrel sidewall 122, and the diffractive optical element 151 abuts the limiting protrusion 123.

The limiting protrusion 123 protrudes inwards from the lens barrel sidewall 122. Specifically, the limiting protrusion 123 protrudes from the lens barrel sidewall 122 into the accommodating cavity 121. The limiting protrusion 123 may have a continuous annular shape; alternatively a plurality of limiting protrusions 123 may be provided, and the plurality of limiting protrusions 123 are spaced apart. The limiting protrusion 123 encloses a light via hole 1231, which may serve as a part of the accommodating cavity 121, and the laser light passes through the light passage hole 1231 and then penetrates into the diffractive optical element 151. In the embodiment shown in FIG. 7, the limiting protrusion 123 is located between the first face 124 and the second face 125. The accommodating cavity 121 between the limiting protrusion 123 and the second face 125 may be configured to accommodate the collimation element 14, and the accommodating cavity 121 between the limiting protrusion 123 and the first face 124 may be configured to accommodate the diffractive optical element 151. When the diffractive optical element 151 is mounted to the limiting protrusion 123, the protection top wall 1521 abuts the first face 124, and the protection sidewall 1522 abuts the outer wall face 1223 of the lens barrel 12. Therefore, the protection top wall 1521 and the limiting protrusion 123 are respectively located on opposite sides of the diffractive optical element 151, or the diffractive optical element 151 is located between the limiting protrusion 123 and the protection top wall 1521, such that even though the joining of the diffractive optical element 151 with the limiting protrusion 123 fails, the diffractive optical element 151 will not escape due to the restriction action of the top cover 152 and the lens barrel sidewall 122. In addition, the lens barrel 12 has a simple structure, and the diffractive optical element 151 is easily mounted to the limiting protrusion 123. During the assembling of the laser projector 10, when the diffractive optical element 151 abuts the limiting protrusion 123, it may be considered that the diffractive optical element 151 is mounted in position, and when the collimation element 14 abuts the limiting protrusion 123, it may be considered that the collimation element 14 is mounted in position. The limiting protrusion 123 includes an upper face 1232, and the upper face 1232 is joined to the diffractive optical element 151 when the diffractive optical element 151 is mounted to the limiting protrusion 123.

As illustrated in FIGS. 10 and 11, each protection sub-sidewall 15221 defines a dispensing hole 1523. The position of the dispensing hole 1523 corresponds to the position of glue receiving groove 126 shown in FIG. 9. When the top cover 152 is covered on the lens barrel 12, glue may be dispensed to the glue receiving grooves 126 via the dispensing hole 1523, and after the glue is cured, the protection sidewall 1522 is fixedly connected to the lens barrel sidewall 122. In one example, each protection sub-sidewall 15221 defines a single dispensing hole 1523. In another example, each protection sub-sidewall 15221 defines a plurality of dispensing holes 1523, such as two, three or four, etc. In the embodiment of the present application, each protection sub-sidewall 15221 defines two dispensing holes 1523, and the two dispensing holes 1523 respectively correspond to two inner sidewalls 1261 of the glue receiving groove 126, such that the user may dispense glue to both sides of the glue receiving groove 126 simultaneously to increase the dispensing speed. Further, the inner sidewall 1261 of the glue receiving groove 126 is obliquely connected to the inner bottom wall 1262 of the glue receiving groove 126 and the outer wall of the lens barrel sidewall 122. The oblique connection indicates that the inner sidewall 1261 and the inner bottom wall 1262, as well as the inner sidewall 1261 and the outer wall face 1223 of the lens barrel sidewall 122 are not perpendicular. When the glue is injected into the inner sidewall 1261, the glue easily flows to a middle of the glue receiving groove 126 under the guiding of the inner sidewall 1261, and the speed at which the glue fills the glue receiving groove 126 is accelerated.

As illustrated in FIGS. 9-11, in some embodiments, the top cover 152 further includes an elastic first hook 1524 protruding inwards from the protection sidewall 1522, and the lens barrel 12 further includes a second hook 127 protruding outwards from the bottom wall 1262 of the glue receiving groove 126. When the top cover 152 is covered on the lens barrel 12, the first hook 1524 and the second hook 127 are caught to restrict the top cover 152 from coming off the lens barrel 12.

Specifically, the first hook 1524 corresponds to the position of the second hook 127. In the process of covering the top cover 152 on the lens barrel 12, the first hook 1524 abuts the second hook 127 and is elastically deformed. When the top cover 152 is mounted in position, the first hook 1524 and the second hook 127 are caught with each other, with tactile feedback and the "click" sound representing they are caught in place. In this way, the top cover 152 and the lens barrel 12 are more reliably joined, and before the top cover 152 is adhered to the lens barrel 12 by the glue, the first hook 1524 and the second hook 127 may be caught with each other, which may effectively fix the relative position of the top cover 152 and the lens barrel 12 to facilitate dispensing.

As illustrated in FIGS. 9-11, in some embodiments, each protection sub-sidewall 15221 is provided with the first hook 1524. Correspondingly, the plurality of glue receiving grooves 126 are each provided with the second hook 127. The second hooks 127 correspond to the positions of the first hooks 1524, and the plurality of first hooks 1524 and the corresponding second hooks 127 are simultaneously caught, such that the joining of the top cover 152 with the lens barrel 12 is more reliable. Specifically, the first hook 1524 may correspond to a middle position of the protection sub-sidewall 15221, and the second hook 127 may correspond to a middle position of the glue receiving groove 126. When each protection sub-sidewall 15221 is provided with at least two dispensing holes 1523, the first hook 1524 are located between the at least two dispensing holes 1523, and more specifically, at least two dispensing holes 1523 of each protection sub-sidewall 15221 are symmetrically distributed with respect to the first hook 1524. In this way, the glue is allowed to flow on both sides of the first hook 1524 and the second hook 127 separately, and the amount of glue on both sides is equivalent, and the adhesion force is relatively uniform.

As illustrated in FIGS. 9 and 11, in some embodiments, the protection sidewall 1522 defines a clearance hole 1525 at a position corresponding to the first hook 1524. In the process of covering the top cover 152 on the lens barrel 12, when the first hook 1524 abuts the second hook 127 and the first hook 1524 is elastically deformed, the clearance hole 1525 provides deformation space for the elastic deformation of the first hook 1524. That is, the first hook 1524 is elastically deformed and extends into the clearance hole 1525. Specifically, when the first hook 1524 abuts the second hooks 127, the first hook 1524 is elastically deformed outwards, and the first hook 1524 extends into the clearance hole 1525 to avoid motion interference with the protection sidewall 1522. It is also convenient for the user to observe the cooperation situation of the first hook 1524 and the second hook 127 through the clearance hole 1525, for example, to determine whether all the first hooks 1524 are caught with the corresponding second hooks 127.

As illustrated in FIGS. 9 and 10, in some embodiments, the second hook 127 is provided with a guiding slope 1271. The guiding slope 1271 is away from the inner bottom wall 1262 along a direction in which the top cover 152 is fitted over the lens barrel 12. In the process of covering the top cover 152 on the lens barrel 12, the first hook 1524 abuts the guide slope 1271. Since the guiding slope 1271 is inclined with respect to the inner bottom wall 1262, during the cooperation of the first hooks 1524 and the second hooks 127, the resisting force of the second hook 127 received by the first hook 1524 slowly and continuously increases and the deformation amount of the first hook 1524 also continuously increases, such that the first hook 1524 and the second hook 127 are easily caught.

As illustrated in FIG. 9, in some embodiments, the lens barrel 12 is provided with a first positioning portion 128, and the outer face of the diffractive optical element 151 is provided with a second positioning portion 1514. The first positioning portion 128 is fitted with the second positioning portion 1514 when and only when the incident face 1512 of the diffractive optical element 151 is joined to the limiting protrusion 123. It can be understood that the incident face 1512 of the diffractive optical element 151 is different from the structure of the emission face 1511, and the incident face 1512 and the emission face 1511 have different effects on the laser light. When in use, if the diffractive optical element 151 is reversed (the emission face 1511 is joined to the limiting protrusion 123), the diffractive optical element 151 will not be able to diffract the desired laser pattern, and may even cause the laser light to be concentratedly emitted and easily burn the user. The first positioning portion 128 and the second positioning portion 1514 of the present embodiment may be correctly fitted only when the incident face 1512 is joined to the limiting protrusion 123. When the cooperation relationship between the diffractive optical element 151 and the lens barrel 12 is not the joining of the incident face 1512 with the upper face 1232 of the limiting protrusion 123, the first positioning portion 128 and the second positioning portion 1514 are not properly fitted, which may be easily perceived by the user. As a result, the misassembly of the diffractive optical element 151 is avoided.

As illustrated in FIG. 9, in some embodiments, the first positioning portion 128 includes a first chamfer 1281, the chamfer 1281 is provided at the intersection of the limiting protrusion 123 and the lens barrel sidewall 122. Specifically, the first chamfer 1281 is provided at the intersection of the upper face 1232 and the lens barrel sidewall 122. The second positioning portion 1514 includes a second chamfer 15141, and the second chamfer 15141 is provided at an intersection of the incident face 1512 and the side face 1513 of the diffractive optical element 151. The inclination angles of the first chamfer 1281 and the second chamfer 15141 may be equal. It can be understood that if the user reverses the diffractive optical element 151, the emission face 1511 will abut the second chamfer 15141, resulting in that the diffractive optical element 151 is raised by the second chamfer 15141, which may be easily perceived by the user that the diffractive optical element 151 is reversed, thus the first chamfer 1281 and the second chamfer 15141 may prevent the diffractive optical element 151 from being reversed.

Figure 12:
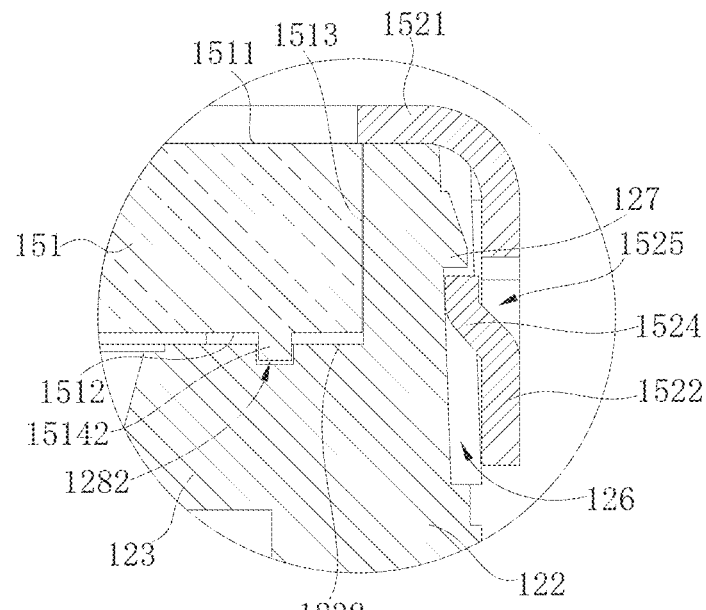
FIG. 12 is a partial schematic view of a laser projector according to an embodiment of the present application.

As illustrated in FIG. 12, in some embodiments, the first positioning portion 128 includes a limiting face recess 1282 defined in the upper face 1232, and the second positioning portion 1514 includes a bottom face protrusion 15142 protruding from the incident face 1512. When the incident face 1512 is joined to the limiting protrusion 123, the bottom face protrusion 15142 extends into the limiting face recess 1282. Specifically, the bottom face protrusion 15142 corresponds to the position of the limiting face recess 1282, and the bottom face protrusion 15142 and the limiting face recess 1282 are equal in number. The bottom face protrusion 15142 may have a cylindrical shape, a truncated cone shape, a prismatic shape, or the like. It can be understood that if the user reverses the diffractive optical element 151, the incident face 1512 will face upward and the bottom face protrusion 15142 makes the diffractive optical element 151 uneven after mounting, which may be easily perceived by the user that the diffractive optical element 151 is reversed, thus the bottom face protrusion 15142 and the limiting face recess 1282 can may prevent the diffractive optical element 151 from being reversed.

Figure 13:
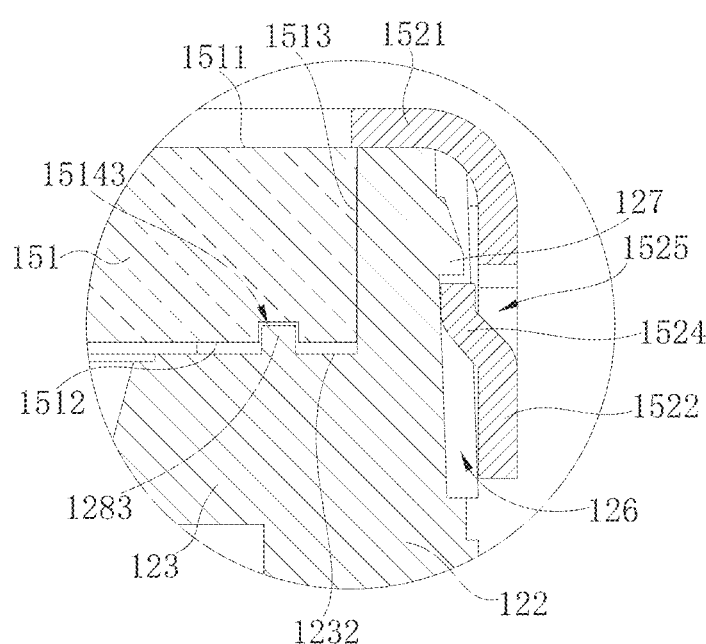
FIG. 13 is a partial schematic view of a laser projector according to an embodiment of the present application.

As illustrated in FIG. 13, in some embodiments, the first positioning portion 128 includes a limiting face protrusion 1283 protruding from the upper face 1232, and the second positioning portion 1514 includes a bottom face recess 15143 defined in the incident face 1512. When the incident face 1512 is joined to the limiting protrusion 123, the limiting face protrusion 1283 extends into the bottom face recess 15143. Specifically, the position of the limiting face protrusion 1283 corresponds to the position of the bottom face recess 15143, and the limiting face protrusion 1283 and the bottom face recess 15143 are equal in number. The limiting face protrusion 1283 may have a cylindrical shape, a truncated cone shape or a prismatic shape, etc. It can be understood that if the user reverses the diffractive optical element 151, the limiting face protrusion 1283 will abut the incident face 1512, resulting in that the diffractive optical element 151 is raised by the limiting face protrusion 1283, which may be easily perceived by the user that the diffractive optical element 151 is reversed, thus the limiting face protrusion 1283 and the bottom face recess 15143 may prevent the diffractive optical element 151 from being reversed.

Figure 14:
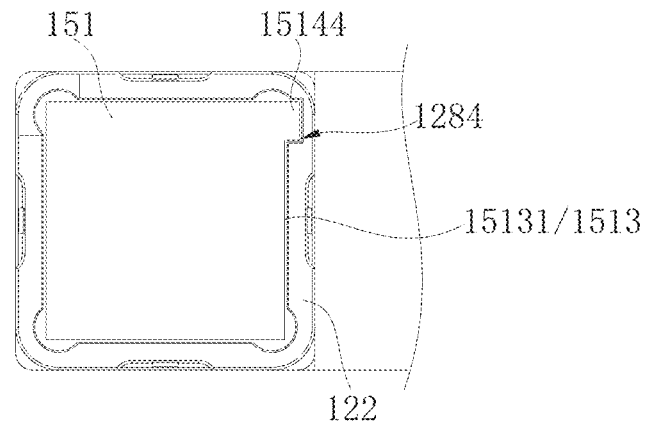
FIG. 14 is a plan view of a laser projector with a top cover removed according to an embodiment of the present application.

As illustrated in FIG. 14, in some embodiments, the first positioning portion 128 includes a lens barrel recess 1284 defined in the lens barrel sidewall 122, and the second positioning portion 1514 includes a side protrusion 15144 protruding outwards from the side face 1513 of the diffractive optical element 151. The side protrusion 15144 extends into the lens barrel recess 1284 when the incident face 1512 is joined to the limiting protrusions 123. The side protrusion 15144 corresponds to the position of the lens barrel recess 1284. The side protrusion 15144 and the lens barrel recess 1284 are equal in number. The shape of the side protrusion 15144 taken along a plane parallel to the incident face 1512 may be one or more of rectangle, semicircle, triangle, trapezoid and circle. It can be understood that if the user reverses the diffractive optical element 151, the side protrusion 15144 will abut the lens barrel sidewall 122, resulting in that the diffractive optical element 151 cannot be mounted to the limiting protrusion 123, which may be easily perceived by the user that the diffractive optical element 151 is reversed, thus the side protrusion 15144 and the lens barrel recess 1284 may prevent the diffractive optical element 151 from being reversed.

Specifically, as illustrated in FIG. 14, in some embodiments, the side face 1513 includes a plurality of sub-sides 15131 that are sequentially connected end to end, and single lens barrel recess 1284 and single side protrusion 15144 are provided. The side protrusion 15144 is provided at a position other than a middle position of the sub-side 15131. That is to say, when the number of the side protrusion 15144 is one, the side protrusion 15144 may be provided at a position other than the middle position of the sub-side 15131, so as to prevent the side protrusion 15144 from extending into the lens barrel recess 1284 when the user reverses the diffractive optical element 151, thereby further preventing the diffractive optical element 151 from being reversed.

Figure 15:
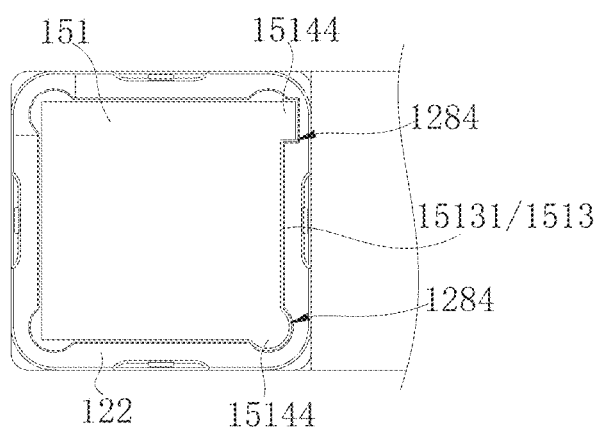
FIG. 15 is a plan view of a laser projector with a top cover removed according to another embodiment of the present application.

As illustrated in FIG. 15, in some embodiments, the lens barrel recess 1284 and the side protrusion 15144 are equal in number, and a plurality of lens barrel recesses 1284 and a plurality of side protrusions are provided. The shape of each side protrusion 15144 is the same as the shape of the corresponding lens barrel recess 1284. Different side protrusions 15144 have different shapes. The side protrusion 15144 and the lens barrel recess 1284 having the same shape means that the outer contour of the side protrusion 15144 is the same as the hollow shape of the lens barrel recess 1284. In the embodiment, since the different side protrusions 15144 have different shapes, the side protrusion 15144 and the lens barrel recess 1284 which are not corresponding to each other cannot be completely fitted due to the different shapes, which may be easily perceived by the user whether the diffractive optical element 151 is correctly mounted.

Figure 16:
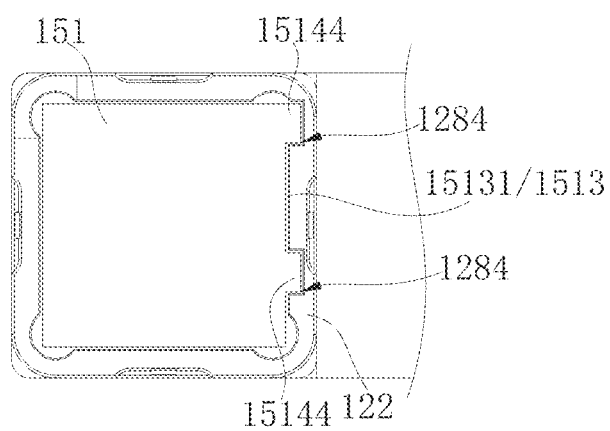
FIG. 16 is a plan view of a laser projector with a top cover removed according to still another embodiment of the present application.

As illustrated in FIG. 16, in some embodiments, the side face 1513 includes the plurality of sub-sides 15131 that are sequentially connected end to end. The lens barrel recess 1284 and the side protrusion 15144 are equal in number, and the plurality of lens barrel recesses 1284 and the plurality of side protrusions 15144 are provided. The plurality of side protrusions 15144 are not symmetrical about the middle position of any one of the sub-sides 15131. In the embodiment shown in FIG. 16, the diffractive optical element 151 has a square shape as a whole, and the side face 1513 includes four sub-sides 15131. Two side protrusions 15144 are provided and both are located on one sub-side 15131, and the two side protrusions 15144 are not symmetrical about the middle position of any one of the sub-sides 15131. Of course, the number of the side protrusions 15144 on one of the sub-sides 15131 may also be one, and the side protrusions 15144 are also distributed on the other sub-sides 15131, but the plurality of side protrusions 15144 are not symmetrical about the middle position of any one of the sub-sides 15131. Thus, when the user would like to rotate the diffractive optical element 151 to be mounted, at least one of the side protrusions 15144 will abut the lens barrel sidewall 122, which may be easily perceived by the user that the diffractive optical element 151 is reversed.

As illustrated in FIG. 16, in some embodiments, the lens barrel recess 1284 and the side protrusion 15144 are equal in number, and a plurality of lens barrel recesses 1284 and a plurality of side protrusions are provided. The plurality of side protrusions 15144 are not equiangularly spaced. Specifically, when two side protrusions 15144 are provided, included angles between respective connecting lines of the two side protrusions 15144 and a center of the diffractive optical element 151 are not 180°; when three side protrusions 15144 are provided, included angles between respective connecting lines of the adjacent two side protrusions 15144 and the center of the diffractive optical elements 151 are not all 120°. Thus, when the user would like to rotate the diffractive optical element 151 to be mounted, at least one of the side protrusions 15144 will abut the lens barrel sidewall 122, which may be easily perceived by the user that the diffractive optical element 151 is reversed.

Figure 17:
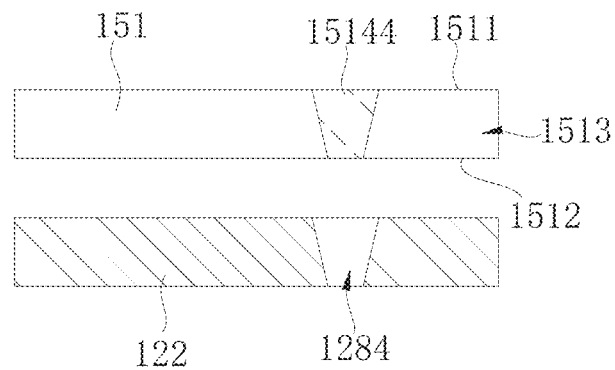
FIG. 17 is a schematic view of a diffractive optical element and a lens barrel sidewall according to an embodiment of the present application.

As illustrated in FIG. 17, in some embodiments, a size of the side protrusion 15144 gradually decreases, and a size of the lens barrel recess 1284 gradually decreases, along a direction from the emission face 1511 to the incident face 1512. Further, the maximum size of the side protrusion 15144 is larger than the minimum size of the lens barrel recess 1284. When the user would like to rotate the diffractive optical element 151 to be mounted, the side protrusion 15144 cannot fully extend into the lens barrel recess 1284 and the diffractive optical element 151 will be raised by the side protrusion 15144, which may be easily perceived by the user that the diffractive optical element 151 is reversed.

Figure 18:
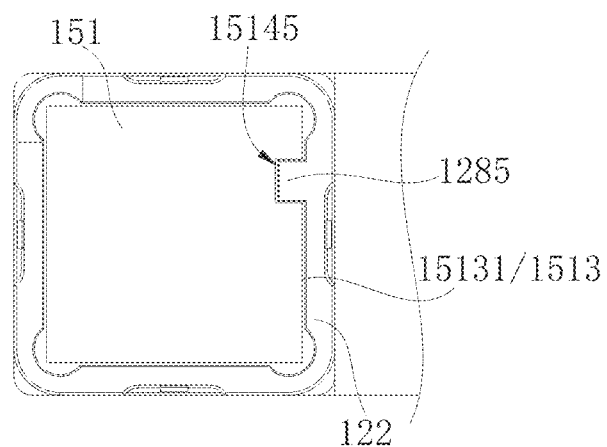
FIG. 18 is a plan view of a laser projector with a top cover removed according to yet another embodiment of the present application.

As illustrated in FIG. 18, in some embodiments, the first positioning portion 128 includes a lens barrel protrusion 1285 protruding from the lens barrel sidewall 122, and the second positioning portion 1514 includes a side recess 15145 defined in the side face 1513. When the incident face 1512 is joined to the limiting protrusion 123, the lens barrel protrusion 1285 extends into the side recess 15145. The lens barrel protrusion 1285 corresponds to the position of the side recess 15145, and the lens barrel protrusion 1285 and the side recess 15145 are equal in number. The shape of the lens barrel protrusion 1285 taken along a plane parallel to the incident face 1512 may be one or more of rectangle, semicircle, triangle, trapezoid and circle. It can be understood that if the user reverses the diffractive optical element 151, the lens barrel protrusion 1285 will abut the diffractive optical element 151, resulting in that the diffractive optical element 151 cannot be mounted to the limiting protrusion 123, which may be easily perceived by the user that the diffractive optical element 151 is reversed, thus the lens barrel protrusion 1285 and the side recess 15145 may prevent the diffractive optical element 151 from being reversed.

Figure 19:
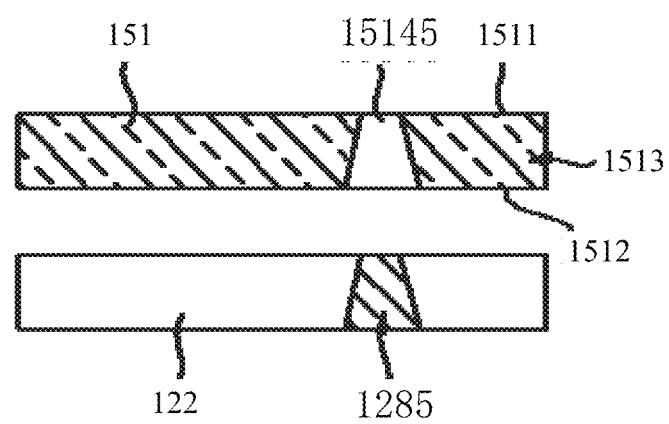
FIG. 19 is a schematic view of a diffractive optical element and a lens barrel sidewall according to yet another embodiment of the present application.

As illustrated in FIG. 19, in some embodiments, the size of the side recess 15145 gradually increases, and the size of the lens barrel protrusion 1285 gradually increases along the direction from the emission face 1511 to the incident face 1512. Further, the maximum size of the lens barrel protrusion 1285 is greater than the minimum size of the side recess 15145. When the user would like to rotate the diffractive optical element 151, the lens barrel protrusion 1285 cannot fully extend into the side recess 15145, and the diffractive optical element 151 will be raised by the lens barrel protrusion 1285, which may be easily perceived by the user that the diffractive optical element 151 is reversed.

As illustrated in FIG. 20, in some embodiments, the diffractive optical element 151 includes a working portion 1515 and a joining portion 1516 provided around the working portion 1515. The protection top wall 1521 defines a light passage hole 15211, and the light passage hole 15211 corresponds to the working portion 1515. The joining portion 1516 is fixedly connected to the protection top wall 1521.

Specifically, the working portion 1515 is provided with a diffractive structure, and the diffractive structure corresponds to the light passage hole 15211. The joining portion 1516 may not be provided with the diffractive structure and is configured to fixedly connected to the top cover 152. As a result, the diffractive optical element 151 may be manufactured more easily without the diffractive structure over the entire face, that is, without the diffractive structure provided on the joining portion 1516. In addition, the joining portion 1516 may be fixedly connected to the protection top wall 1521 by gluing. Of course, the joining portion 1516 may also be manufactured with a structure, such as a snap groove, configured to be joined to the top cover 152, so as to better join the diffractive optical element 151 with the top cover 152.

Figure 21:
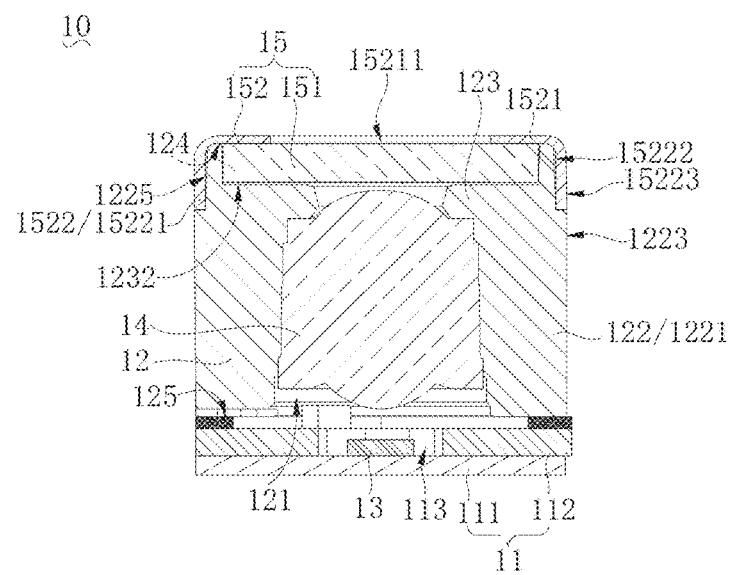
FIG. 21 is a sectional view of a laser projector according to yet another embodiment of the present application taken along a position corresponding to the line VI-VI shown in FIG. 4.

As illustrated in FIG. 21, in some embodiments, an end of the outer wall face 1223 of the lens barrel sidewall 122 adjacent to the first face 124 defines a recess 1225. When the top cover 152 is covered on the lens barrel 12, the protection sidewall 1522 is fitted in the recess 1225, such that the outer wall face 15223 of the protection sidewall 1522 is flush with the outer wall face 1223 of the lens barrel sidewall. Specifically, in the process of assembling the laser projector 10, when the diffractive optical element 151 abuts the limiting protrusion 123 and the protection sidewall 1522 extends into the recess 1225, it can be considered that the diffractive optical assembly 15 is mounted in place.

As illustrated in FIG. 22, in some embodiments, the lens barrel 12 includes the limiting protrusion 123 protruding inwards from the lens barrel sidewall 122, and the upper face 1232 of the limiting protrusion 123 is flush with the first face 124. The limiting protrusion 123 encloses the light via hole 1231. The top cover 152 includes the protection top wall 151 and the protection sidewall 152 extending from the periphery of the protection top wall 151. The diffractive optical element 151 extends into the light via hole 1231 and abuts the inner wall 12311 of the light via hole 1231. The protection top wall 1521 abuts the limiting protrusion 123, and the protection sidewall 1522 abuts the lens barrel sidewall 122.

Specifically, when the diffractive optical assembly 15 and the lens barrel 12 are mounted, the diffractive optical element 151 extends into the light via hole 1231, and the side face 1513 of the diffractive optical element 151 abuts the inner wall 12311 of the light via hole 1231. The protection top wall 1521 abuts the first face 124 (the upper face 1232 of the limiting protrusion 123), and the sidewall inner face 15222 of the protection sidewall 1522 abuts the outer wall face 1223 of the lens barrel 12. Thus, under the collective clamping action of the diffractive optical element 151, the protection top wall 1521 and the protection sidewall 1522, the diffractive optical assembly 15 is firmly joined to the lens barrel 12 to prevent the diffractive optical assembly 15 from rotating around the lens barrel sidewall 122 to fall off.

Although embodiments of present application have been shown and described above, it should be understood that above embodiments are explanatory, and cannot be construed to limit the present application, for those skilled in the art, changes, modifications, alternatives, and variations can be made to the embodiments without departing from the scope of the present application. The scope of the present application is defined by the claims or the like.

What is claimed is:

1. A laser projector, comprising:
a substrate assembly;
a lens barrel comprising a lens barrel sidewall provided to the substrate assembly, the lens barrel sidewall comprising a first face and a second face opposite to each other, the second face being joined to the substrate assembly; and
a diffractive optical assembly provided to the first face and comprising a diffractive optical element and a top cover, the diffractive optical element and the top cover being fixedly connected, the diffractive optical element being located within the lens barrel, the top cover being at least partially located outside the lens barrel, and the top cover clamping the lens barrel together with the diffractive optical element.

2. The laser projector according to claim 1, wherein the lens barrel defines an accommodating cavity together with the substrate assembly, and the diffractive optical element is accommodated in the accommodating cavity.

3. The laser projector according to claim 2, wherein the top cover comprises a protection top wall and a protection sidewall extending from a periphery of the protection top wall, the protection top wall is joined to the diffractive optical element, and the diffractive optical element abuts an inner wall face of the lens barrel sidewall, and the protection sidewall abuts an outer wall face of the lens barrel sidewall.

4. The laser projector according to claim 3, wherein the diffractive optical element comprises a working portion and a joining portion provided around the working portion, the protection top wall defines a light passage hole corresponding to the working portion, and the joining portion is fixedly connected to the protection top wall.

5. The laser projector according to claim 3, wherein the protection top wall is made of a transparent material, the diffractive optical element comprises an incident face and an emission face opposite to each other, and the protection top wall and the emission face are fixedly connected.

6. The laser projector according to claim 3, wherein the lens barrel further comprises a limiting protrusion protruding inwards from the lens barrel sidewall, and the diffractive optical element abuts the limiting protrusion.

7. The laser projector according to claim 1, wherein the lens barrel further comprises a limiting protrusion protruding inwards from the lens barrel sidewall, an upper face of the limiting protrusion is flush with the first face, the limiting protrusion encloses a light via hole, and the top cover comprises a protection top wall and a protection sidewall extending from a periphery of the protection top wall, the diffractive optical element extends into the light via hole and abuts against an inner wall of the light via hole, the protection top wall abuts the limiting protrusion, and the protection sidewall abuts the lens barrel sidewall.

8. The laser projector according to claim 1, wherein the diffractive optical element is integrally formed with the top cover; or the diffractive optical element is separately formed from the top cover.

9. The laser projector according to claim 1, wherein the diffractive optical element has a material identical to a material of the top cover; or the diffractive optical element has a material different from a material of the top cover.

10. The laser projector according to claim 2, wherein the top cover comprises a protection top wall and a protection sidewall extending from a periphery of the protection top wall, the top cover further comprises an elastic first hook protruding inwards from the protection sidewall, the lens barrel further comprises a second hook protruding outwards from the lens barrel sidewall, and the first hook is caught with the second hook when the top cover is fitted over the lens barrel.

11. The laser projector according to claim 10, wherein the protection sidewall defines a clearance hole at a position corresponding to the first hook, and the clearance hole is configured to provide a deformation space when the first hook abuts the second hook and the first hook is elastically deformed in a process of the top cover being fitted over the lens barrel.

12. The laser projector according to claim 10, wherein an outer wall of the lens barrel defines a glue receiving groove, and the glue receiving groove is opened from the first face and extends towards the second face.

13. The laser projector according to claim 12, wherein the second hook is provided with a guiding slope, and the guiding slope is gradually away from an inner bottom wall of the glue receiving groove along a direction in which the top cover is fitted over the lens barrel, and the first hook abuts the guiding slope in the process of the top cover covering the lens barrel.

14. The laser projector according to claim 12, wherein the protection sidewall comprises a plurality of protection sub-sidewalls sequentially connected end to end, and each protection sub-sidewall is fixedly connected to the lens barrel sidewall.

15. The laser projector according to claim 14, wherein each protection sub-sidewall defines a dispensing hole, and a position of the dispensing hole corresponds to a position of the glue receiving groove.

16. The laser projector according to claim 12, wherein an inner sidewall of the glue receiving groove is obliquely connected to an inner bottom wall of the glue receiving groove and the outer wall of the lens barrel sidewall.

17. The laser projector according to claim 2, further comprising:
a light source provided to the substrate assembly and configured to emit laser light to the accommodating cavity; and
a collimation element accommodated in the accommodating cavity;
wherein the light source, the collimation element and the diffractive optical element are sequentially provided in an optical path of the light source.

18. An image acquisition device, comprising:
a laser projector; and
an image acquirer configured to acquire a laser pattern projected into a target space through the diffractive optical element, the laser pattern being configured to form a depth image;
wherein the laser projector comprises:
a substrate assembly,
a lens barrel comprising a lens barrel sidewall provided to the substrate assembly, the lens barrel sidewall comprising a first face and a second face opposite to each other, the second face being joined to the substrate assembly; and
a diffractive optical assembly provided to the first face and comprising a diffractive optical element and a top cover, the diffractive optical element and the top cover are fixedly connected, the diffractive optical element being located within the lens barrel, the top cover being at least partially located outside the lens barrel, and the top cover clamping the lens barrel together with the diffractive optical element.

19. The image acquisition device according to claim 18, wherein a projection window corresponding to the laser projector and an acquisition window corresponding to the image acquirer are defined in the image acquisition device, the laser projector is configured to project a laser pattern to the target space through the projection window, and the image acquirer is configured to acquire the laser pattern modulated by a target object through the acquisition window.

20. An electronic apparatus, comprising:
  a housing; and
  an image acquisition device comprising:
    a laser projector; and
    an image acquirer configured to acquire a laser pattern projected into a target space through the diffractive optical element, the laser pattern being configured to form a depth image;
  wherein the laser projector comprises:
    a substrate assembly,
    a lens barrel comprising a lens barrel sidewall provided to the substrate assembly, the lens barrel sidewall comprising a first face and a second face opposite to each other, the second face being joined to the substrate assembly; and
    a diffractive optical assembly provided to the first face and comprising a diffractive optical element and a top cover, the diffractive optical element and the top cover are fixedly connected, the diffractive optical element being located within the lens barrel, the top cover being at least partially located outside the lens barrel, and the top cover clamping the lens barrel together with the diffractive optical element,
  wherein the image acquisition device is provided to the housing and configured to acquire a depth image.

* * * * *